Patented Aug. 31, 1926.

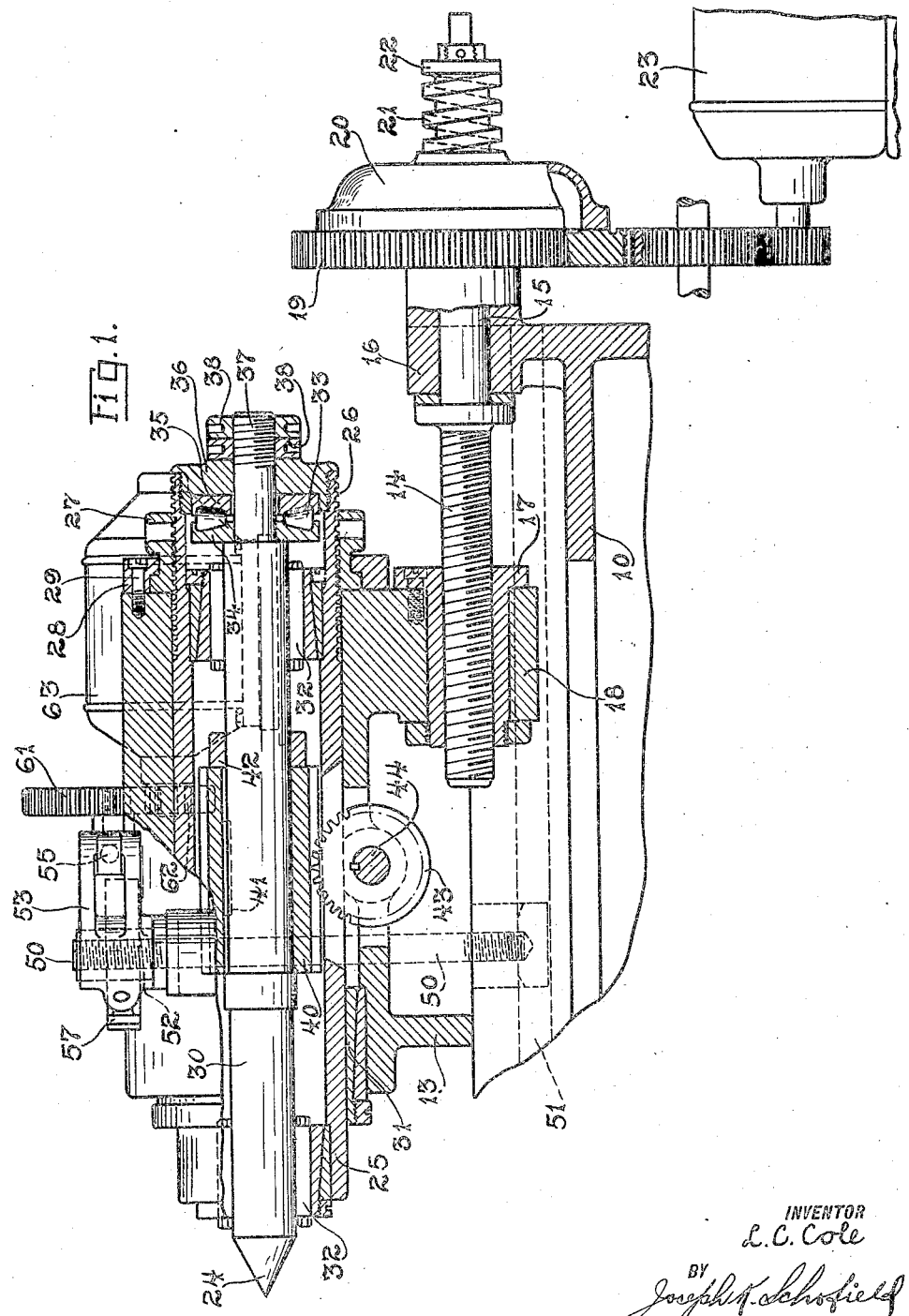

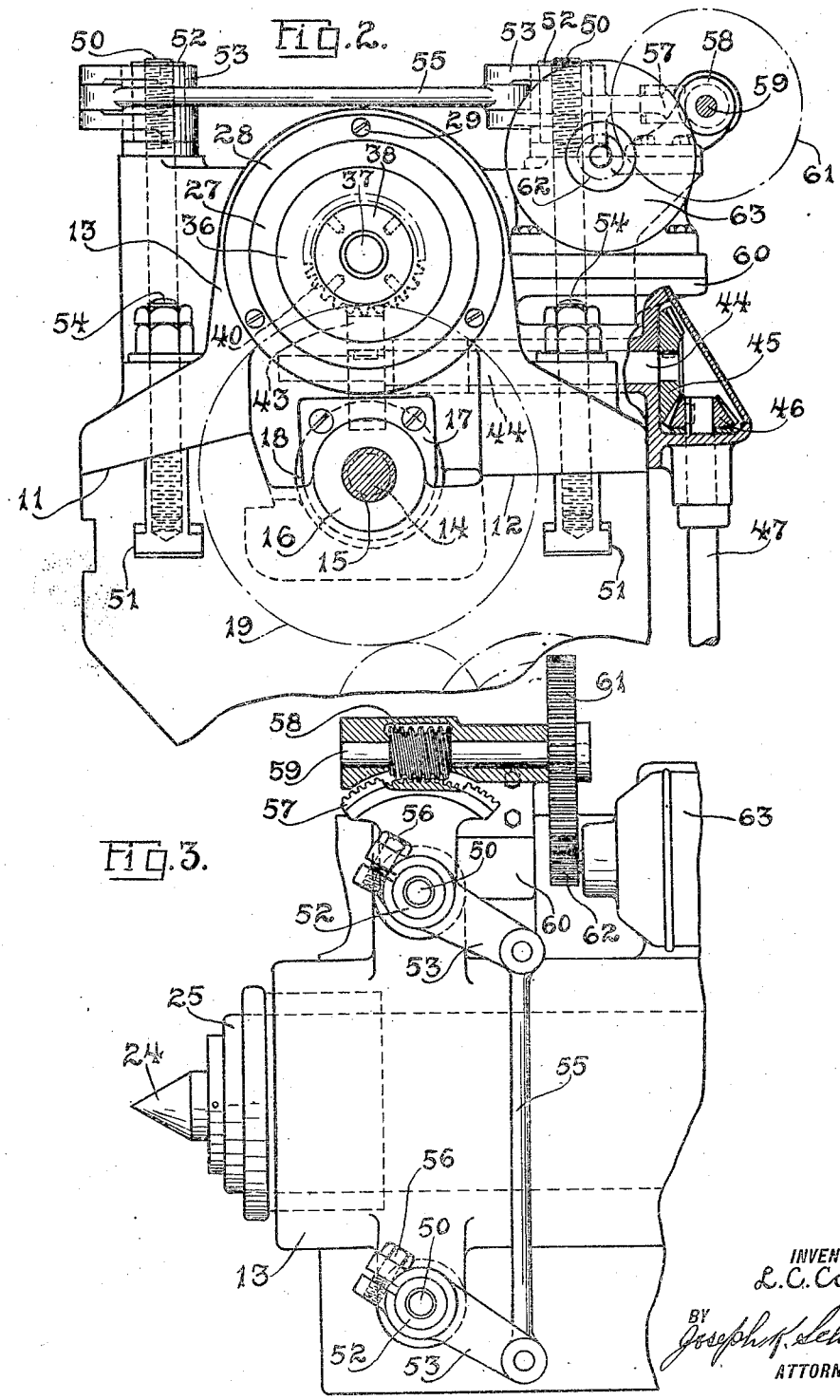

1,598,120

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

TAILSTOCK ADJUSTING AND CLAMPING MEANS.

Application filed July 19, 1924. Serial No. 727,020.

This invention relates to tailstocks for lathes of large size and particularly for a semi-automatic lathe adapted to operate upon railway wheel axles or upon other very large cylindrical work.

An object of the present invention is to provide an improved form of tailstock for lathes which may be entirely operated by power means so that it can be advanced into operative position against the work and then be clamped rigidly in position without requiring manual means for operating it.

One feature which enables me to accomplish the above named object is that a motor is provided adjacent the base of the lathe for advancing the tailstock into operative position and a supplemental motor of small size is provided on the tailstock for clamping the tailstock in position.

Another object of the present invention is to provide a tailstock having a rotating center spindle positively driven so that it may be rotated at the same speed as the headstock spindle and work.

Another feature which is advantageous is that a roller thrust bearing is provided for the center spindle within the tailstock so that a minimum friction will be developed, also roller bearings are preferably provided for supporting the rotating center spindle upon a fixed axis within the tailstock.

With these and other objects in view, my invention consists in the features of construction and operation set forth in the following specification and illustrated in the accompanying drawings.

In the accompanying drawings annexed hereto and forming a part of this specification, I have shown my invention embodied in a lathe for turning railway wheel axles but it will be understood that the invention can be otherwise embodied and that the drawings are not to be construed as defining or limiting the scope of the invention, the claims appended to this specification being relied upon for that purpose.

In the drawings:—

Figure 1 is a longitudinal view partly in section showing the construction of the tailstock and its attached parts.

Fig. 2 is an end elevation of the same, and

Fig. 3 is a fragmentary plan view showing the means for clamping the tailstock to the bed, parts being broken away to more clearly show their construction.

In the above mentioned drawings, I have shown but one embodiment of the invention which is now deemed preferable but it is to be understood that changes and modifications may be made within the scope of the appended claims without departing from the spirit of the invention.

Briefly, and in its broadest aspect, my invention comprises the following principal parts: first, a tailstock adjustably mounted on suitable ways on the upper surface of a lathe bed; second, a screw frictionally rotated through appropriate gearing by a motor to move the tailstock to its operative and inoperative positions; third, a sleeve positioned in the tailstock and extending axially thereof; fourth, an elongated center spindle positioned within the sleeve and mounted for rotation therein; fifth, means to positively rotate the center spindle through geared connections from the work rotating mechanism; and sixth, power means to clamp the tailstock upon the ways, these clamping means being actuated by a supplemental motor.

Referring more in detail to the figures of the drawings, I provide a lathe, portions of the bed 10 only being shown. On suitable ways 11 and 12 provided on the upper surface of this lathe 10 is a tailstock 13 which may be adjusted along the ways 11 and 12 to any desired position. For this purpose, a screw 14 is rotatably mounted in a bearing 15 in a projection 16 formed on the base of the lathe 10 and engaging a nut 17 secured to a depending projection 18 formed in the mid portion of the tailstock 13. In order to rotate this screw 14 to adjustably position the tailstock 13, a gear 19 is loosely mounted upon an extension of the screw 14 which is contacted by a friction plate 20 splined to the extension of the screw 14 and urged against one face of the gear 19 by a coiled spring 21 surrounding the extension. The end of the spring 21 is engaged by a collar 22 fastened to the end of the extension. In mesh with the frictionally driven gear 19 are driving connections from the motor 23 conveniently positioned adjacent the bed of the lathe 10. It will be seen from the above described mechanism that rotation of the motor 23 in either direction by suitable controlling means conveniently located will move the tailstock 13 in either direction along the ways 11 and 12, and, as soon as the tailstock 13 has its center 24 engaged by the work, the gear 19 will rotate relative to the friction plate 20 thus preventing further movement of the tailstock 13. By suitably adjusting the tension of the spring 21, the pressure of the tailstock center 24 against the end of the work may be adjusted.

Mounted longitudinally in the tailstock 13 is a hollow spindle or sleeve 25 having a threaded portion 26 near one end which is in engagement with a collar 27. This collar 27 is rotatably held in position upon the tailstock 13 by means of a split ring 28, the segments of which are held by screws 29 against the outer end face of the tailstock 13. By rotating this nut or collar 27, the axial position of the sleeve 25 relative to the tailstock 13 may be adjusted to adapt the sleeve and the center spindle 30 relative to the tailstock 13 for different work. A cylindrical bearing 31, which may be adjusted, is provided near the forward end of this sleeve 25 so that the sleeve 25 may be prevented from lateral movement but still be adjustable longitudinally. This bearing member 31 is made adjustable so that all lost motion between the sleeve 25 and the member 31 may be taken up as the parts become worn. As this bearing member 31 and its adjusting means may be of usual or conventional form, further description is not thought to be necessary.

Within the sleeve 25 is the center spindle 30 extending the entire length of the sleeve. This spindle 30, at one end, is provided with a conical surface which forms the work engaging surface 24 of the spindle. The spindle 30 is retained in position by two roller or other bearings 32 near opposite ends and is retained from axial movement by a thrust bearing 33 near its outer end and adapted to take the entire pressure of the work against the spindle 30. This thrust bearing 33 has one member 34 fastened to and adapted to rotate with the center spindle 30, the opposite member 35 being retained in a collar 36 preferably threaded into the outer end of the sleeve 25. By means of a threaded extension 37 on the center spindle 30 and suitable adjusting nuts 38, the center spindle 30 may be held in its rearmost position but permitted to rotate freely. Positioned about midway of the center spindle 30 is an elongated gear 40 preferably having helical teeth thereon. This is splined or otherwise secured in position on the spindle 30 as for instance by the key 41 and the retaining collar 32 at one end. The teeth of this gear 40 are adapted to mesh with the helical teeth of a gear 43 mounted on the inner end of a short transverse shaft 44. This transverse shaft 44 extends through the tailstock 13 and is provided at its rear end with a bevel gear 45. By means of another bevel gear 46 on a driving shaft 47, the spindle 30 may be rotated at any desired speed. In the preferred embodiment of the invention, this shaft 47 for rotating the center spindle 30 is drivingly connected to the headstock spindle of the lathe (not shown) so that it will rotate at exactly the same speed as the work. It will therefore be seen that there will be no relative rotative movement between the work and the tailstock center spindle 30 and therefore this center will not be subject to any wear or over-heating.

With the tailstock 13 in its adjusted operative position, it must be rigidly secured to the bed of the lathe 10. In order to rigidly clamp the tailstock 13 to the ways, special clamping means are provided. These comprise elongated screws 50, the lower ends of which enter T-slots 51 extending along the bed of lathe 10. The upper ends of these screws 50 are threaded and are engaged by suitable nuts 52. Slight rotation of these nuts 52 will therefore clamp or unclamp the tailstock 13 on the bed. For this purpose, the clamping nuts 52 are engaged by levers 53 in a manner so that the nuts 52 can be positioned at any rotative position relative to the levers 53. Means are provided for simultaneously oscillating these levers 53 to rotate the nuts 52 and clamp or unclamp the tailstock 13. If desired, supplementary manually operable clamping screws 54 may also be provided.

As the tailstock 13 forming the subject matter of this invention is adapted primarily for lathes of large sized work and heavy duty, two power actuated clamping screws 50 and nuts 52 are provided, one screw directly over the front ways 11 and the second screw directly over the rear ways 12, the levers 53 for operating the nuts 52 being linked together by rod 55 as shown clearly in Fig. 3. The levers 53 at the points adjacent the nuts 52 are split, the split portion having a screw 56 so that the levers 53 may be rigidly secured to the nuts 52 with the nuts in any rotative position.

One of the levers 53 is provided with a segmental gear 57 preferably of the worm gear type which is in mesh with a worm 58 on a shaft 59 suitably supported rotatably within a projection 60 formed on the tailstock. A spur gear 61 on the opposite end of this shaft 59 has its teeth in mesh with a pinion 62 on the armature shaft of a small motor 63. It will therefore be seen that rotation of the motor 63 in either direction will rotate the shaft 59 and oscillate the supplemental gear 57 and the clamping levers 53 in either direction, thus clamping or unclamping the tailstock 13.

What I claim is:—

1. A tailstock for lathes comprising in combination, a tailblock, a sleeve member axially movable therein, a center carrying spindle within said sleeve, a gear on said spindle, and means in mesh with said gear to positively rotate said spindle.

2. A tailstock for lathes comprising in combination, a tailblock, a sleeve member axially adjustable therein, a center spindle within said sleeve, a thrust bearing for said center spindle within said sleeve, and means to positively rotate said spindle.

3. A tailstock for lathes comprising in combination, a tailblock, a center spindle therein, power means to move said tailblock axially of said lathe, a pair of clamping screws for said tailblock, clamping nuts on said screws, and power means to simultaneously operate said nuts on said screws to clamp or unclamp said tailblock relative to the lathe in any adjusted position.

4. A tailstock for lathes comprising in combination, a tailblock, a center spindle therein, power means to move said tailblock axially of said lathe, a pair of clamping screws for said tailblock, nuts on said screws, levers on said nuts, and power means to simultaneously actuate said levers to clamp or unclamp said tailblock relative to the lathe in any adjusted position.

5. A tailstock for lathes comprising in combination, a tailblock, a center spindle therein, power means to move said tailblock axially of said lathe, a pair of clamping screws for said tailblock, nuts on said screws, levers adjustably fastened to said nuts, and power means to simultaneously actuate said levers to clamp or unclamp said tailblock relative to the lathe in any adjusted position.

6. A tailstock for lathes comprising in combination, a tailblock, a center spindle therein, power means to move said tailblock axially of said lathe, a pair of clamping screws for said tailblock, nuts on said screws, levers adjustably fastened to said nuts, a segmental gear carried by one of said levers, and power means to oscillate said gear to simultaneously actuate said levers to clamp or unclamp said tailblock relative to the lathe in any adjusted position.

In testimony whereof, I hereto affix my signature.

LYNDON C. COLE.